United States Patent [19]

McCleery

[11] Patent Number: 4,762,325
[45] Date of Patent: Aug. 9, 1988

[54] TRAINING DEVICE FOR GOLFERS

[76] Inventor: Ray A. McCleery, 9753 Greenwood Rd., Grass Lake, Mich. 49240

[21] Appl. No.: 29,979

[22] Filed: Mar. 25, 1987

[51] Int. Cl.⁴ ............................................. A63B 69/36
[52] U.S. Cl. ........................... 273/183 B; 273/183 E; 2/199; 33/262; 351/155
[58] Field of Search .......... 33/262; 273/183 B, 183 E, 273/190 A; 2/199; 351/155

[56] References Cited

U.S. PATENT DOCUMENTS

| | | | |
|---|---|---|---|
| 1,169,188 | 1/1916 | Peck | 33/262 |
| 2,330,442 | 9/1943 | Nero | 263/183 B |
| 3,156,211 | 11/1964 | Mallory, Jr. | 116/114 |
| 3,264,002 | 8/1966 | Palumbo | 273/183 B |
| 3,437,339 | 4/1969 | Starck | 273/183 B |
| 3,729,199 | 4/1973 | Granberg | 273/183 B |
| 4,298,201 | 11/1981 | Palinkas | 273/183 B |
| 4,531,743 | 7/1985 | Lott | 273/183 B |
| 4,696,111 | 9/1987 | Gardner | 273/183 E |

*Primary Examiner*—George J. Marlo
*Attorney, Agent, or Firm*—Beaman & Beaman

[57] ABSTRACT

A golf instructional aid mounted upon the golfer's head to teach and encourage head immobility during swinging of the golf club and to aid in alignment of the club swing and movement with respect to the desired direction of ball travel. A cap mounted support includes a ball and socket mount and a pair of parallel spaced reference elements which each include a reference mark permitting a golf ball to be visually "bracketed" between the reference elements wherein head movement is readily detected and the position of the head with respect to the ball is visibly discernible.

6 Claims, 1 Drawing Sheet

U.S. Patent  Aug. 9, 1988  4,762,325
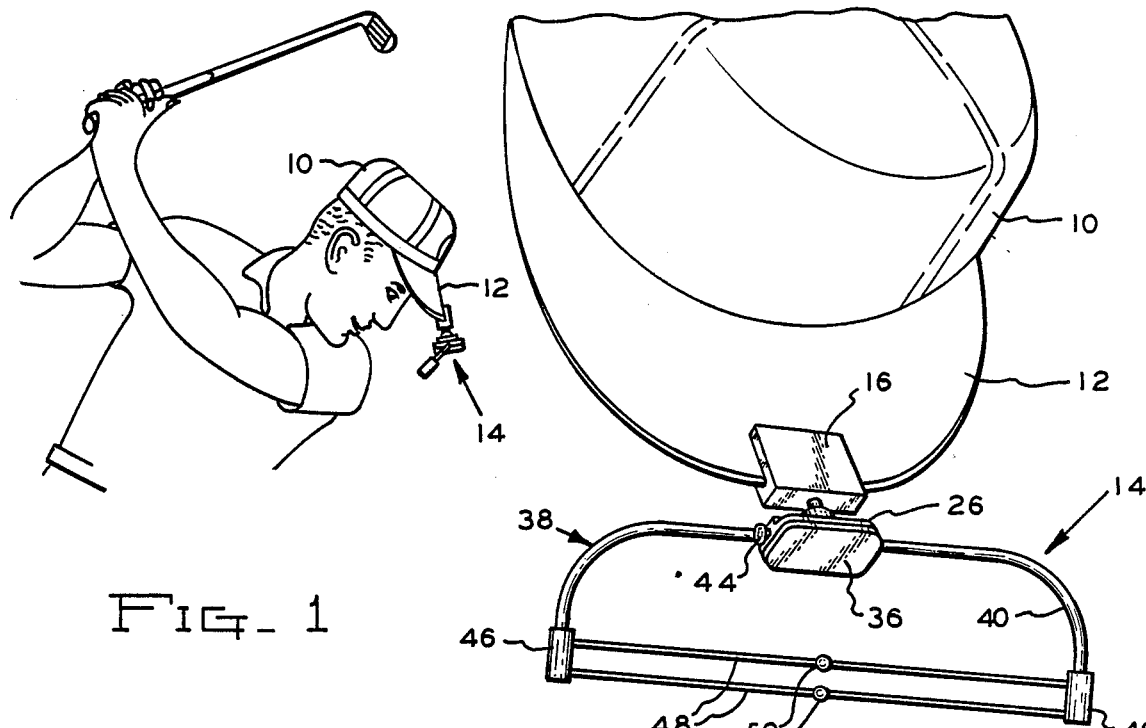
Fig. 1
Fig. 2
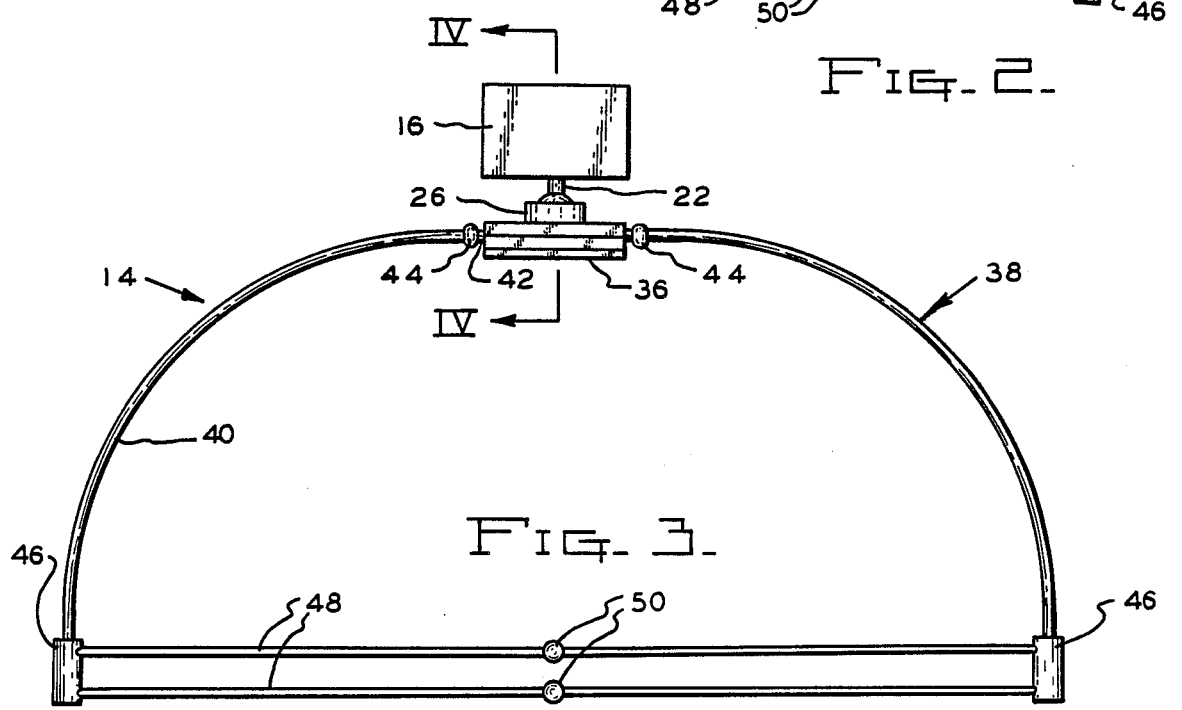
Fig. 3
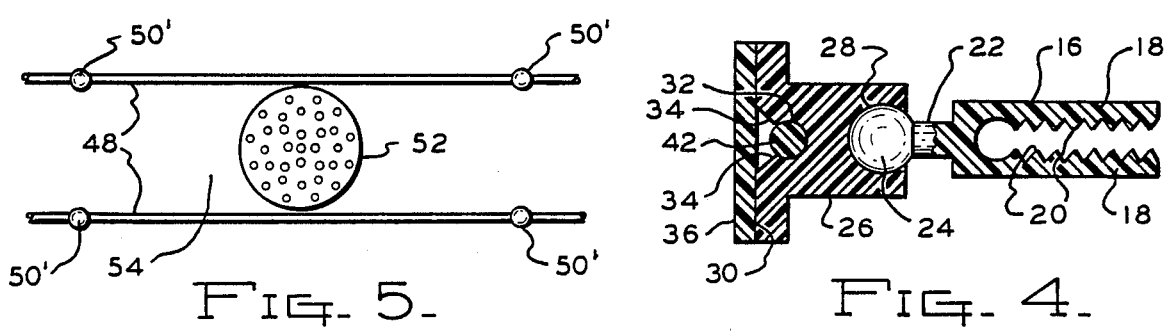
Fig. 5
Fig. 4

TRAINING DEVICE FOR GOLFERS

BACKGROUND OF THE INVENTION

Golfers have long recognized that immobility of the head and proper orientation and alignment with the ball and the desired direction of club movement are essential to a correct and accurate golf club swing. Beginning golfers are constantly reminded to observe the location of the ball after being struck, and not to lift or turn the head until after the swing has been substantially completed. Also, the necessity for aligning the body with the direction of desired movement of the ball is basic to proper play.

A number of instructional aids have been proposed for encouraging immobility of the head and alignment of the body to the ball. Such devices are often attached to the player's head by eyeglasses or eyeglass-type devices or to a cap worn by the player, and typical devices are shown in U.S. Pat. Nos. 3,264,002; 3,437,339; 3,729,199 and 4,531,743.

It is an object of the invention to provide a golf instructional aid readily affixed to the wearer's head which teaches and encourages the player to immobilize his head during the golf swing.

A further object of the invention is to provide a golf instructional aid attached to the wearer's head which encourages immobilization of the head during the golf swing and wherein a visual image is provided of the relationship between the player's head and the ball prior to the ball being struck.

Yet another object of the invention is to provide a golf instructional aid attached to the player's head which aids in the alignment of the player to the ball with respect to the desired direction of ball movement, and wherein the aid does not interfere with the golf swing and detraction is minimized.

An additional object of the invention is to provide a golf instructional aid which is easy to use, economical to manufacture and purchase, and wherein the use of the aid is readily understandable by the average player.

A golf instructional aid in accord with the concepts of the invention basically consists of a pair of thin elongated reference elements located within the player's line of vision when addressing a golf ball. A reference mark is located upon at least one of the elements within the line of vision and the elements and mark define an area or "box" in which the addressed ball is visually observed. The location and maintenance of the ball within the "box" indicates to the player the relative immobility of the head and also indicates the alignment of the body and head to the desired direction of ball movement. The reference elements and marks are located relatively close to the player's eyes, and although the eyes are focusing on the ball, rather than on the reference elements and mark, the presence of the elements and mark are readily discerned, but are not distracting or interfere with vision of the addressed ball.

The reference elements are mounted upon the wearer's head and are stationary with respect to the head during the addressing of the ball and club swing or movement. The elements are mounted upon a bow held by a holder which is mounted to a clip by a ball and socket type hinge. The clip is preferably attached to the visor of a cap worn by the player. It is also envisioned that the aid could be mounted upon eyeglasses worn by the player, or other suitable means could be used for attaching the aid to the wearer's head.

BRIEF DESCRIPTION OF THE DRAWINGS

The aforementioned objects and advantages of the invention will be appreciated from the following description and accompanying drawings wherein:

FIG. 1 is a view of a golfer having an instructional aid in accord with the invention mounted to a cap, FIG. 2 is a perspective view of a golf instructional aid in accord with the invention, FIG. 3 is a plan elevational view of the aid, FIG. 4 is an elevational, sectional view taken through the mounting means along Section IV—IV of FIG. 3, and FIG. 5 is a representation of the view of the golf ball and instructional aid as seen by the player during use.

DESCRIPTION OF THE PREFERRED EMBODIMENT

While a golf instructional aid in accord with the invention can be mounted to the wearer's head by eyeglass-type mounting means, or the like, the preferred arrangement is to mount the aid upon the visor of a conventional golf cap as represented at 10 in FIG. 1. The hat includes the typical visor 12 which is relatively stiff and capable of supporting the lightweight golf instructional aid generally indicated at 14.

The golf instructional aid includes a clip 16 which has a pair of fingers 18 located in spaced parallel relationship having serrations 20 defined thereon whereby the front edge of the cap visor 12 may be inserted between the fingers and the clip will be frictionally mounted upon the visor. The clip includes a stem 22 having a spherical ball 24 mounted thereto, and the entire clip structure is preferably homogeneously molded of synthetic plastic.

A synthetic plastic frame holder 26 is pivotally mounted upon the ball 24. The holder includes a rear surface having a spherical socket 28 defined therein for receiving the ball 24 in a "snap-in" relationship wherein the holder 26 is frictionally and pivotally mounted upon the clip 16 such that the holder retains the desired angular relationship to the clip.

The front portion of the frame holder 26 is provided with a flat surface 30 and an elongated recess 32 of cylindrical configuration, and oblique beveled surfaces 34 intersect the surface 30 and the recess for permitting the frame bow to be snapped therein as later described. An ornamental cover plate 36 of synthetic plastic is placed on the holder surface 30 to improve the appearance of the holder and a decoration or logo may be defined thereon.

A frame 38 is pivotally mounted within the holder recess 32. The frame includes a bow 40 having arcuate portions and a linear central portion 42 of cylindrical configuration. Positioning abutments 44 are spaced apart upon the central portion 42 a distance slightly greater than the width of the holder 26 whereby the central portion 42 may be snapped into the recess 32 and the abutments 44 will maintain the desired relationship between the bow 40 and the frame holder, and yet the bow may be pivoted within the recess.

At its ends, the bow 40 is provided with enlarged portions 46 from which extend a pair of thin parallel spaced elongated reference elements 48. The reference elements 48 each include a central region and at the center of each central region a reference mark 50 is located which may consist of an enlarged portion of the associated reference element. Preferably, the entire frame 38, including reference elements 48 and reference marks 50 are molded of a single piece of high strength synthetic plastic material.

In use, the clip 16 is mounted upon the player's cap visor 12 as appreciated from FIG. 1. If it is not desired to use the instructional aid 14, the frame 38 may be easily pivoted upwardly out of the vision of the wearer, such pivoting occurring between the frame and the holder 26 at the recess 32, and the pivotal movement between the holder 26 and the clip due to the ball 24 and socket 28 also aids in pivoting the frame to its nonused position.

To employ the aid 14 the frame 38 is pivoted downwardly so that the reference elements 48 are directly within the natural line of vision between the wearer's eyes and the addressed golf ball. By means of the ball and socket interconnection between the clip 16 and holder 26, the frame 38 may be readily tilted relative to the clip to align the reference elements 48 with the wearer's eyes such that the reference elements are parallel with the eyes, i.e. each reference element appears as a straight line when focusing on the ball, rather than as two parallel lines, which is the case if the reference elements are not parallel with the eyes. As the reference elements 48 will be located within six or seven inches of the eyes, the eyes are not focused upon the reference elements, but their presence is readily discerned when focusing upon the golf ball and the proper alignment of the reference elements to the eyes is easily accomplished without requiring any special skills due to the universal adjustment provided by the ball 24 and socket 28.

The distance separating the reference elements 48 is such that the addressed golf ball is readily visible and may be located between the reference elements. Once the player properly positions himself to the addressed golf ball, the reference elements 48, which have been previously aligned with the eyes, may be properly located relative to the golf ball by pivoting of the frame 38 within the holder recess 32 and the proper orientation of the reference elements to the ball is easily accomplished.

As the player observes the addressed golf ball 52, the reference elements 48 and the reference marks 50 will appear as shown in FIG. 5. Due to the proximity of the reference marks 50 to the eyes, and the fact that the player is focusing upon the golf ball 52, two reference marks 50' will appear to exist on each reference element 48, and a "box" 54 will be defined by the reference elements and "four" reference elements.

The properly oriented golfer will locate the ball 52 within the center of the "box" 54 as shown in FIG. 5 and maintain the head immobile so as to keep the relationship of FIG. 5 during the golf swing and continue to maintain this position of the head after the ball has been struck. Thus, it will be appreciated that the invention permits the player to readily observe the relationship of his head to the ball and maintain that relationship during the golf swing insuring head immobility.

The elongated configuration of the reference elements 48 also permits the head to be aligned with the desired direction of ball movement, and this aspect of the invention aids in increasing the accuracy of drives and iron shots, and is very helpful during putting. While putting, the reference elements 48 will be aligned with the desired direction of ball movement, and the reference elements appear to define a "track" for the ball during putting.

As the frame 38 may be easily pivoted to an upward out-of-the-way position above the cap visor 12, and as the entire aid 14 is of very little weight, the presence of the aid on the cap is unobjectionable, and yet the aid is available for immediate use when desired.

It is appreciated that various modifications to the inventive concepts may be apparent to those skilled in the art without departing from the spirit and scope of the invention.

I claim:

1. A golf aid for encouraging immobility of the head and proper alignment of the head, ball and swing comprising, in combination, a frame, mounting means connected to the frame for mounting the frame upon the head within the wearer's line of sight when addressing a golf ball, and a pair of spaced parallel, linear, elongated reference elements mounted on said frame each having ends and mounted to said frame at said ends to provide an unobstructed central region whereby an addressed golf may be observed between said reference elements and the relationship to the wearer's head and the desired direction of ball movement determined, and at least one visible reference mark defined on said central region of at least one of said reference elements, said one reference mark appearing to the frame wearer as two reference marks when addressing a golf ball.

2. In a golf aid as in claim 1, said one reference mark is defined at the center of said central region of each of said reference elements.

3. In a golf aid as in claim 1, said mounting means comprising a resilient clip having spaced fingers adapted to receive a cap visor therebetween, a frame holder pivotally connected to said frame, and a ball and socket joint interconnecting said clip and said holder.

4. In a golf aid as in claim 3, said frame comprising a bow formed of a thin arcuate member having a central region and ends, said reference elements being connected to and interposed between said arcuate member ends, said frame holder including an elongated cylindrical recess slit throughout its length, said arcuate bow member central region being cylindrical and linear in configuration and being frictionally received within said holder recess for pivotal movement therein.

5. In a golf aid as in claim 4, said frame holder and reference elements being formed of synthetic plastic.

6. In a golf aid as in claim 1, said frame comprising a bow formed of a thin arcuate member having a central region and ends, said reference elements being connected to and interposed between said arcuate member ends.

* * * * *